US012204432B2

(12) United States Patent
Rafey

(10) Patent No.: US 12,204,432 B2
(45) Date of Patent: Jan. 21, 2025

(54) COMPUTER UPDATE PERFORMANCE ASSESSMENT

(71) Applicant: Dell Products, L.P., Round Rock, TX (US)

(72) Inventor: Mohammad Rafey, Karnataka (IN)

(73) Assignee: DELL PRODUCTS L.P., Round Rock, TX (US)

( * ) Notice: Subject to any disclaimer, the term of this patent is extended or adjusted under 35 U.S.C. 154(b) by 724 days.

(21) Appl. No.: 17/477,496

(22) Filed: Sep. 16, 2021

(65) Prior Publication Data

US 2023/0078333 A1    Mar. 16, 2023

(51) Int. Cl.
   *G06F 11/34*    (2006.01)
   *G06F 8/65*    (2018.01)
   *G06F 11/30*    (2006.01)

(52) U.S. Cl.
   CPC ............ *G06F 11/3423* (2013.01); *G06F 8/65* (2013.01); *G06F 11/3072* (2013.01); *G06F 11/3466* (2013.01)

(58) Field of Classification Search
   CPC .... G06F 11/3423; G06F 8/65; G06F 11/3072; G06F 11/3466
   See application file for complete search history.

(56) References Cited

U.S. PATENT DOCUMENTS

| 6,282,709 B1* | 8/2001 | Reha .......................... G06F 8/65 717/178 |
| 9,507,689 B2* | 11/2016 | Basu ...................... G06F 11/368 |
| 9,928,097 B1* | 3/2018 | Krottapalli ................ G06F 8/65 |

* cited by examiner

*Primary Examiner* — Elias Desta
(74) *Attorney, Agent, or Firm* — Amin, Turocy & Watson, LLP

(57) ABSTRACT

A system can determine performance data for updates created by update creators that execute on devices during a time period, the performance data indicating performance of a group of metrics for a respective update of the updates. The system can determine a first ranking of the update creators for the time period based on the performance data. The system can determine a second ranking of the update creators based on applying a pairwise comparison count of respective rankings of update creators of the first ranking and rankings for time periods prior to the time period. The system can determine whether to publish a first update from a first update creator of the update creators based on a position of the first update creator among the update creators in the second ranking.

20 Claims, 13 Drawing Sheets

400

| NAME | DESCRIPTION | COMPRESSED? | FILE SYSTEM | SIZE | FREE |
|---|---|---|---|---|---|
| C: | LOCAL HARD DRIVE | NO | NTFS | 3,000 GB | 1,200 GB |
| D: | CD-ROM DRIVE | N/A | N/A | N/A | N/A |
| E: | LOCAL HARD DRIVE | NO | NFTS | 2,000 GB | 120 GB |

FIG. 4

| ID | FEATURES | PERCEPTION | THRESHOLD LIMIT | WEIGHTAGE COEFFICIENT |
|---|---|---|---|---|
| 1 | FEATURE 1 | P/N | 90 | 3 |
| 2 | FEATURE 2 | P/N | 60% | 6 |
| 3 | FEATURE 3 | P | N/A | 2 |

| 602 | FEATURE ID | | |
|---|---|---|---|
| OEM ID | 1 | 2 | 3 |
| A | 32 | 67 | 76 |
| B | 22 | 65 | 98 |
| C | 32 | 45 | 76 |

| 702 OEM ID | FEATURE ID | | |
|---|---|---|---|
| | 1 | 2 | 3 |
| A | P | P | P |
| B | P | P | N |
| C | P | P | P |

| INDEX RANK | OEM ENTITY ID |
|---|---|
| 1 | C |
| 2 | A |
| 3 | B |

| RANK | | | |
|---|---|---|---|
| 1 | 2 | 3 | FINAL RANKING SCORE |
| A | B | C | 20 |
| A | C | B | 23 |
| B | A | C | 34 |
| B | C | A | 56 |
| C | A | B | 87 |
| C | B | A | 45 |

FIG. 9

COMPUTER UPDATE PERFORMANCE ASSESSMENT

BACKGROUND

Updates and patches can be produced for computer systems. When a new update or patch is available, the creator of the update or patch (or an intermediary) can notify a computer system of the availability, and the computer system can install the upgrade or patch.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

The system can determine performance data for updates created by update creators that execute on devices during a time period, the performance data indicating performance of a group of metrics for a respective update of the updates. The system can determine a first ranking of the update creators for the time period based on the performance data. The system can determine a second ranking of the update creators based on applying a pairwise comparison count of respective rankings of update creators of the first ranking and rankings for time periods prior to the time period. The system can determine whether to publish a first update from a first update creator of the update creators based on a position of the first update creator among the update creators in the second ranking.

An example method can comprise determining, by a system comprising a processor, performance data for updates created by update creators that execute on customer devices during a time period according to a group of metrics. The method can further comprise determining, by the system, a first ranking of the update creators for the time period based on the performance data. The method can further comprise determining, by the system, a second ranking of the update creators based on applying a pairwise comparison count of respective rankings of update creators of the first ranking and rankings for other time periods. The method can further comprise determining, by the system, whether to publish a first update from a first update creator of the update creators based on a ranking of the first update creator in the second ranking.

An example non-transitory computer-readable medium can comprise instructions that, in response to execution, cause a system comprising a processor to perform operations. These operations can comprise determining performance metrics for respective first updates from update creators that execute via customer computers during a time period. The operations can further comprise determining a first ranking of the update creators for the time period based on the performance metrics. The operations can further comprise determining a second ranking of the update creators based on applying a pairwise comparison of respective rankings of update creators in the first ranking and in other rankings for other time periods other than the time period. The operations can further comprise determining whether to publish second updates from a first update creator of the update creators based on the second ranking.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates example performance data that can facilitate computer update performance assessment, in accordance with an embodiment of this disclosure;

FIG. 5 illustrates example feature configurations that can facilitate computer update performance assessment, in accordance with an embodiment of this disclosure;

FIG. 6 illustrates example feature data collection that can facilitate computer update performance assessment, in accordance with an embodiment of this disclosure;

FIG. 7 illustrates an example perception report that can facilitate computer update performance assessment, in accordance with an embodiment of this disclosure;

FIG. 8 illustrates an example performance ranking that can facilitate computer update performance assessment, in accordance with an embodiment of this disclosure;

FIG. 9 illustrates another example performance ranking that can facilitate computer update performance assessment, in accordance with an embodiment of this disclosure;

DETAILED DESCRIPTION

Overview

Figure 1:
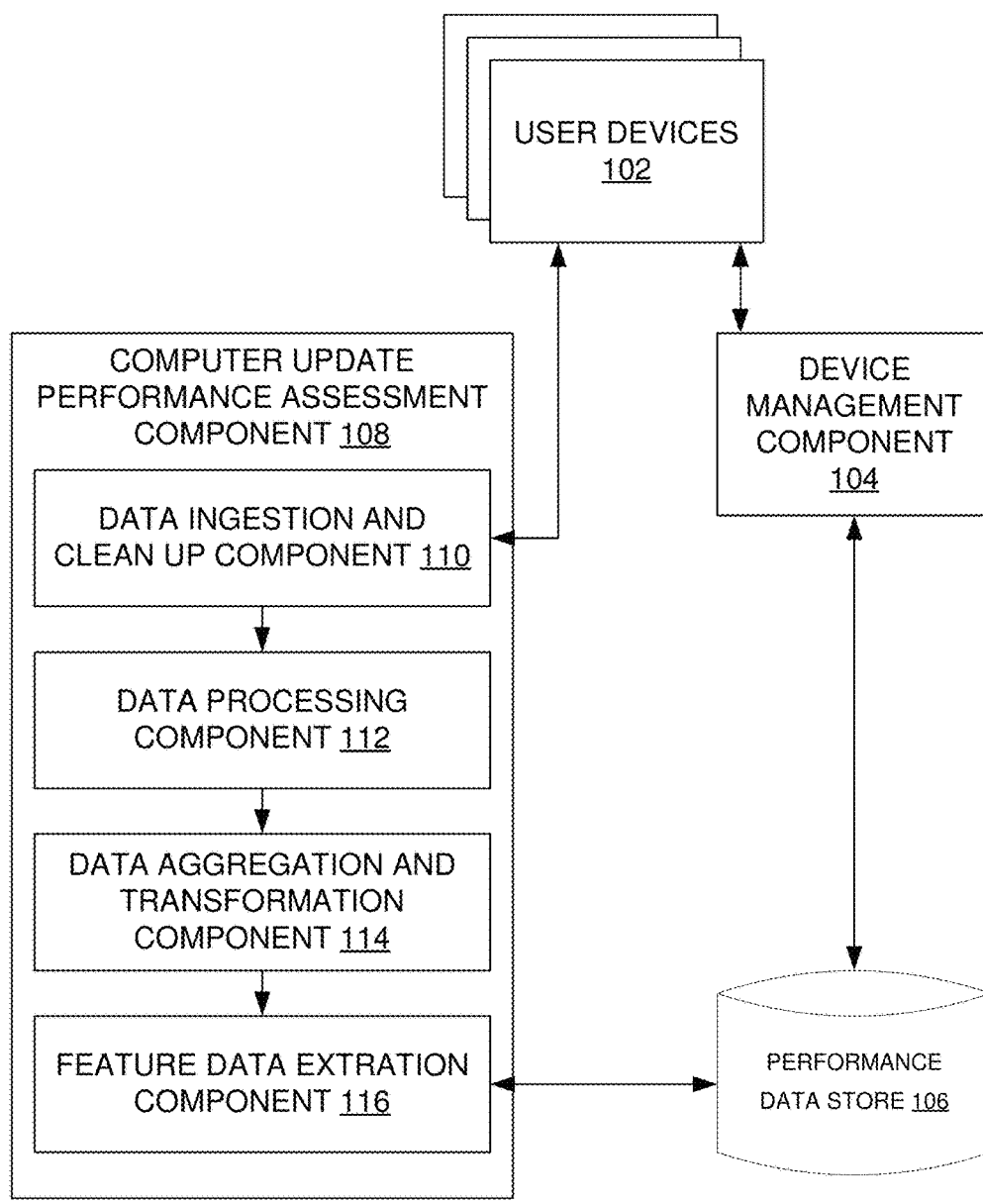
FIG. 1 illustrates an example system architecture that can facilitate computer update performance assessment, in accordance with an embodiment of this disclosure.

Software upgrading, installation, and patching can be an important part of customer support and service. When a new version of software, a device driver, firmware or a component is available, a creator of that new version can notify customer computers about the update, so that the customers can update their system.

In some examples, a computer manufacturer can use components from other companies in building a computer. These other companies can be referred to as original equipment manufacturers (OEMs). The computer manufacturer can manage updates and send notifications to users about update availability through software installed on those computers. Updates can be based on multiple factors, such as device build, model, or configuration.

A third-party software creator or OEM can certify an update to be compatible with a given computer configuration and stable for intended devices. Based on this certification, the computer manufacturer can inform the intended users about this update being available.

In spite of this certification process, in some examples, users can experience device issues after updates are installed on their systems. These device issues can be traced to certain updates, despite those updates being marked as compatible and stable for the given device models by the OEM. Thus, these problematic updates can cause issues on the destination devices that affect performance, such as an increased rate of kernel panics.

Prior techniques for providing updates rely on OEM confirmations or certification that its latest update is in condition to be rolled out to users. These prior techniques lack an independent mechanism to measure, benchmark, or certify the OEM's claims. That is, prior techniques can have the following problems.

Prior techniques can lack a proactive, independent, and intelligent advisory mechanism for possible compatibility issues that can arise with proposed software updates.

Prior techniques can lack an intelligent assessment framework of an OEM's historical update performance with respect to user devices, which can lead to no proactive remediation actions being possible with respect to avoiding later issues and incidents.

With prior techniques, issues and errors can be detected in the field while the product is being used by the user. Fixing issues in the field can be significantly more costly than fixing issues in a design phase, a system testing phase, or an integration testing phase.

The prior techniques can lead to an indirect cost of damaged relationships and lost opportunities due to malfunctioning updates.

The present techniques can be implemented to mitigate against these problems with prior techniques. In some examples, the present techniques can be implemented to measure field performance of third party OEM existing and rolled out updates that are running on user devices. A daily performance perception report can be built for each OEM based on their actual performance in the field, and a daily ranking report can be generated for the OEMs. A combined set of a daily ranking report and historical ranking reports can be used to determine an optimal rank aggregation. In some examples, this can be determined based on a Kemeny-Young model. A global quality index ranking can be determined based on the optimal ranking aggregation.

Consistent good performance can be rewarded, and consistent bad performance can be penalized, based on perception, for a gradual change up and down the ranking hierarchy over time.

These techniques can be integrated into a manufacturer's software update system to proactively take intelligent decisions on the latest available software updates being ready to be pushed to the customer. This can be performed without relying on OEM certifications.

The present techniques can be implemented to provide an intelligent device updates management framework, which can measure a field performance of third party OEM's existing and rolled-out updates that are running on customer's devices.

The present techniques can be implemented to build a periodic performance perception report for respective OEMs based on their actual performance in the field and generates a daily ranking report.

A combination of a periodic ranking report and past historical periodic ranking reports can be used and applied to a rank aggregation technique (which can be an optimal rank aggregation technique) that can be based on a Kemeny-Young model, to determine a final performance ranking.

A final performance ranking can indicate a metric to establish an OEM's overall performance reputation and quality and stability of its updates. A higher ranking for an OEM can correspond to a higher quality of its software updates (such as components, firmware, device drivers, etc.). These techniques can reward consistent good performance and penalize consistent bad performance based on perception, for a gradual movement up and down a ranking hierarchy over time.

The present techniques can provide for an intelligent customer device update management framework, which can be integrated into a device management component to proactively take intelligent decisions on software updates that are available to be pushed to users.

Prior techniques rely on an OEM's manual confirmation on update quality and stability. This approach is manual and inefficient, and can require customer support resources when updates do not perform as intended. This problem can be mitigated against using the present techniques by measuring update quality independently, without relying on immeasurable and untraceably manual OEM certifications.

The present techniques can be integrated into a device management component to act as an intelligent and autonomous gateway that allows high quality updates to reach user devices while restricting low quality updates from doing so.

Example Architectures

FIG. 1 illustrates an example system architecture 100 that can facilitate computer update performance assessment, in accordance with an embodiment of this disclosure. System architecture comprises user devices 102, device management component 104, performance data store 106, and computer update performance assessment component 108. In turn, computer update performance assessment component 108 comprises data ingestion and clean up component 110, data processing component 112, aggregation and transformation component 114, and feature data extraction component 116.

Figure 13:
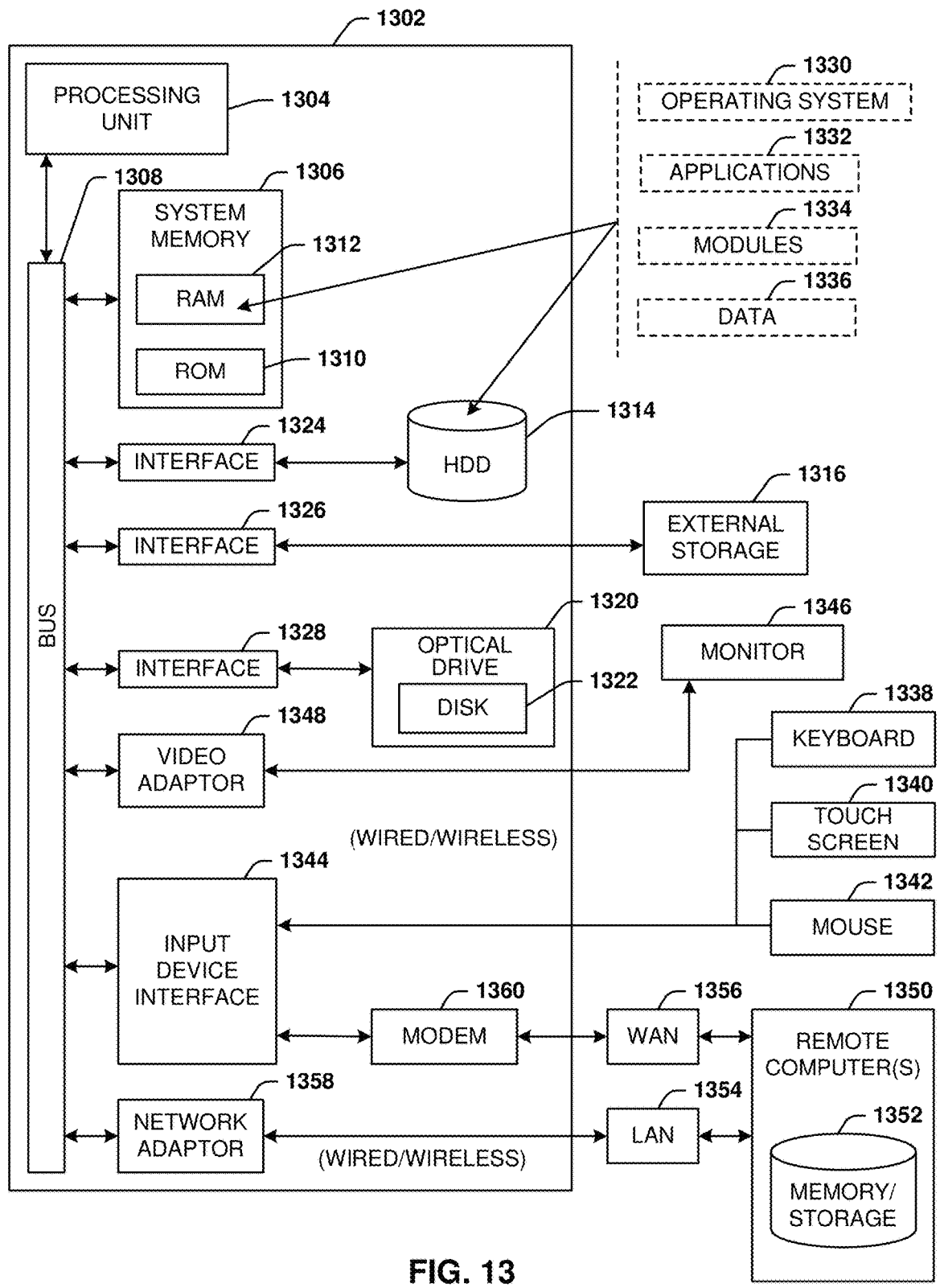
FIG. 13 illustrates an example block diagram of a computer operable to execute an embodiment of this disclosure.

In some examples, user devices 102, device management component 104, performance data store 106, and/or computer update performance assessment component 108 can be implemented with part(s) of computing environment 1300 of FIG. 13.

User devices 102 can comprise multiple user devices, such as computers, that are deployed at user sites and for which updates are periodically available. Device management component 104 can manage parts of user devices 102, such as by sending new updates to user devices 102 to install, after device management component 104 vets those updates.

To facilitate computer update performance assessment, device management component 104 can use information from performance data store 106 to determine whether to instruct user devices 102 to install certain updates.

Performance data store 106 can contain information about the performance of updates from certain update creators, such as a performance ranking. The data of performance data store 106 can be generated by computer update performance assessment component 108, and be based on information that computer update performance assessment component 108 gathers from user devices 102.

This information can be received by computer update performance assessment component 108 at data ingestion and clean up component 110, which can receive the data, aggregate the data, and remove data that is dirty, duplicate, and/or stale. Data processing component 112 can process this data from data ingestion and clean up component 110 to identify information relevant to computer update performance assessment.

Aggregation and transformation component 114 can combine data received from multiple user devices of user devices 102, and transform it into a known format, such as an extensible markup language (XML) file. Feature data extraction component 116 can extract features from this data that are used to generate a performance data ranking.

Figure 10:
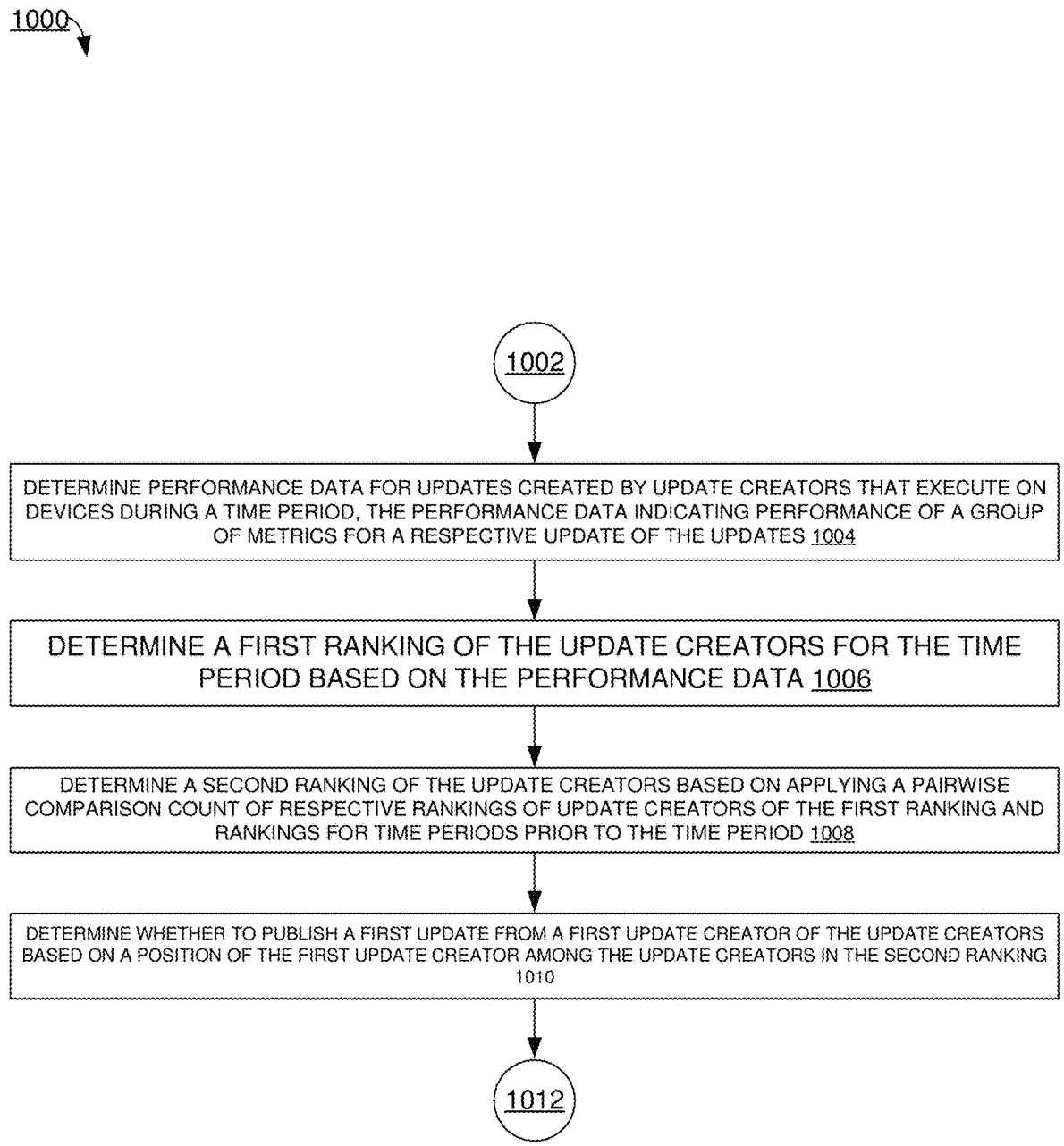
FIG. 10 illustrates an example process flow that can facilitate computer update performance assessment, in accordance with an embodiment of this disclosure.
Figure 11:
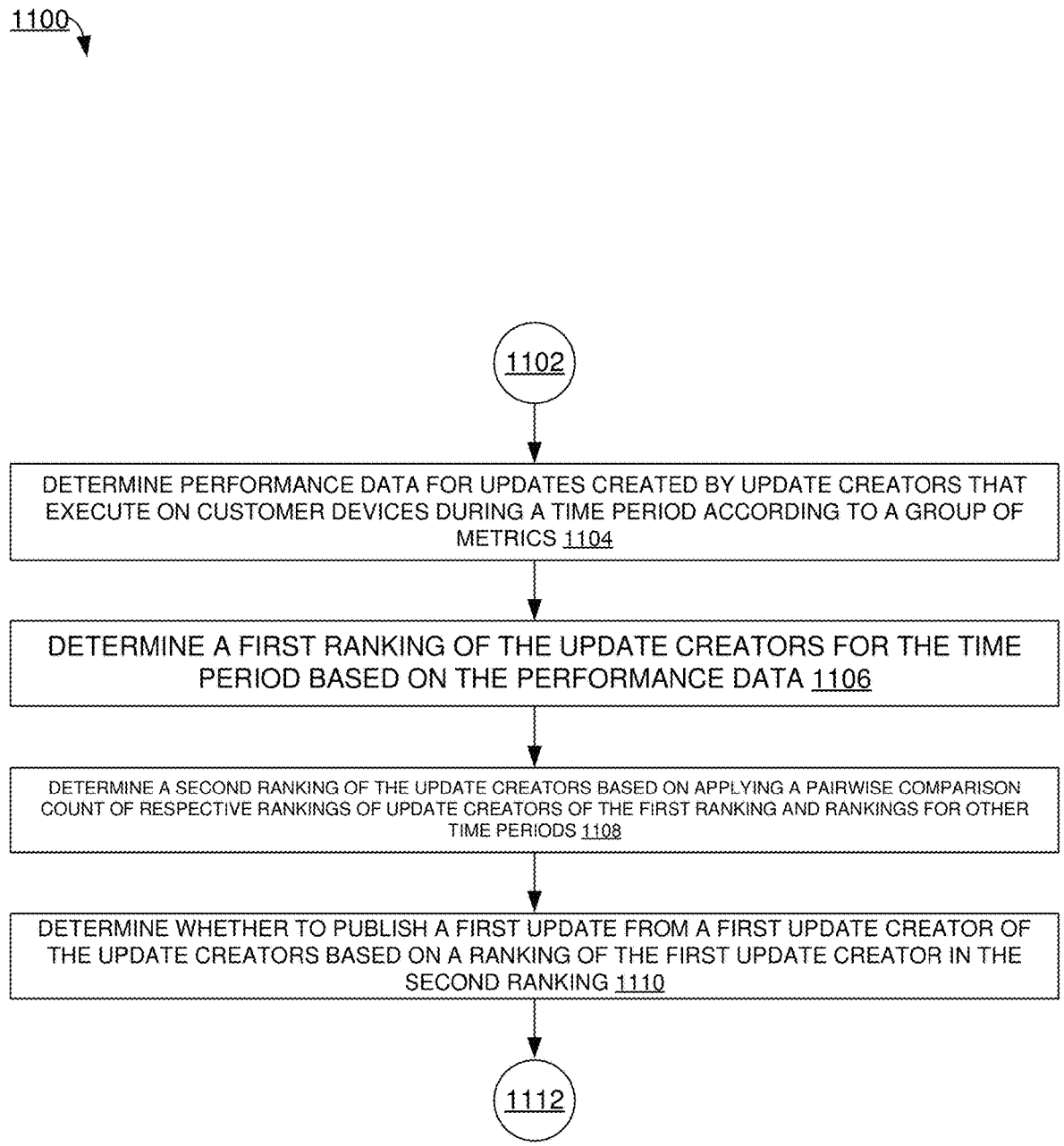
FIG. 11 illustrates another example process flow that can facilitate computer update performance assessment, in accordance with an embodiment of this disclosure.
Figure 12:
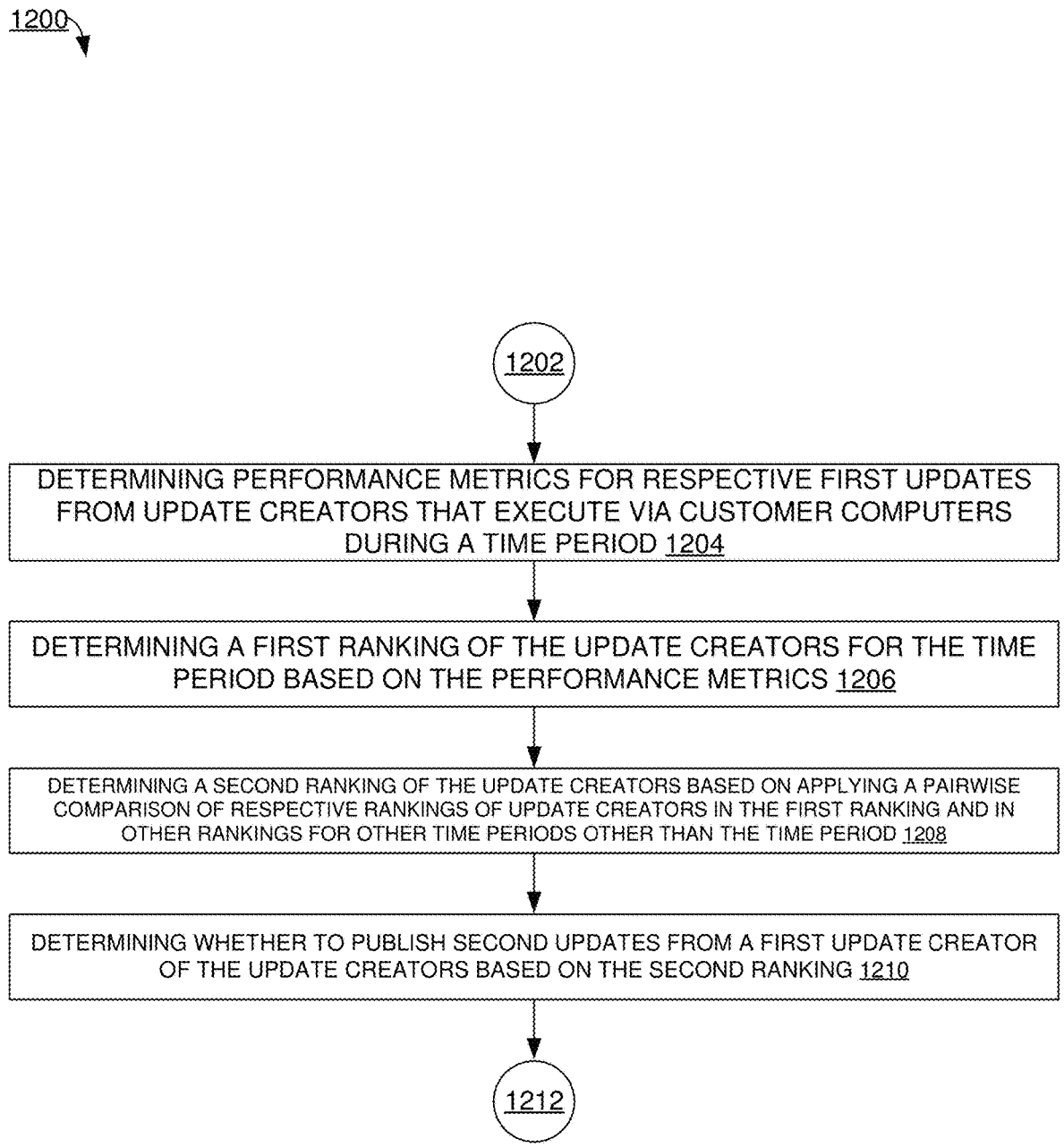
FIG. 12 illustrates another example process flow that can facilitate computer update performance assessment, in accordance with an embodiment of this disclosure.

In the course of facilitating computer update performance assessment, system architecture 100 can implement part(s) of process flow 1000 of FIG. 10, process flow 1100 of FIG. 11, and/or process flow 1200 of FIG. 12.

Figure 3:
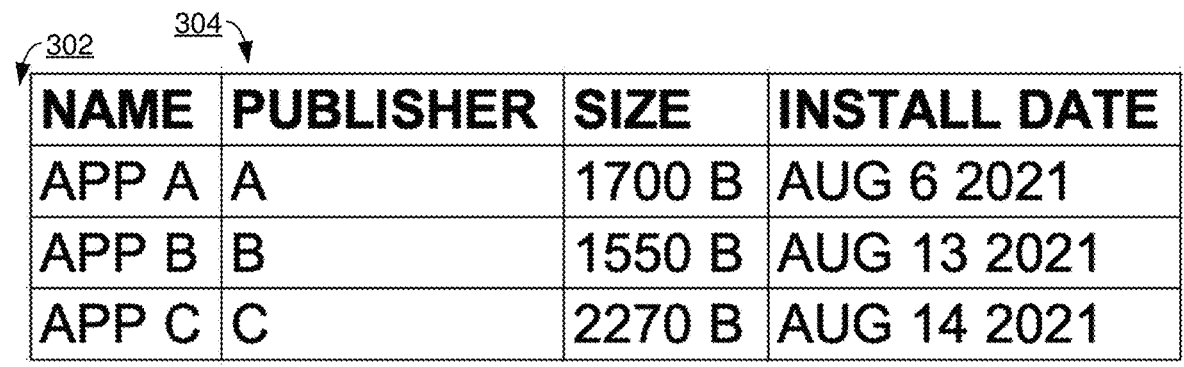
FIG. 3 illustrates example performance data that can facilitate computer update performance assessment, in accordance with an embodiment of this disclosure.
Figure 8:
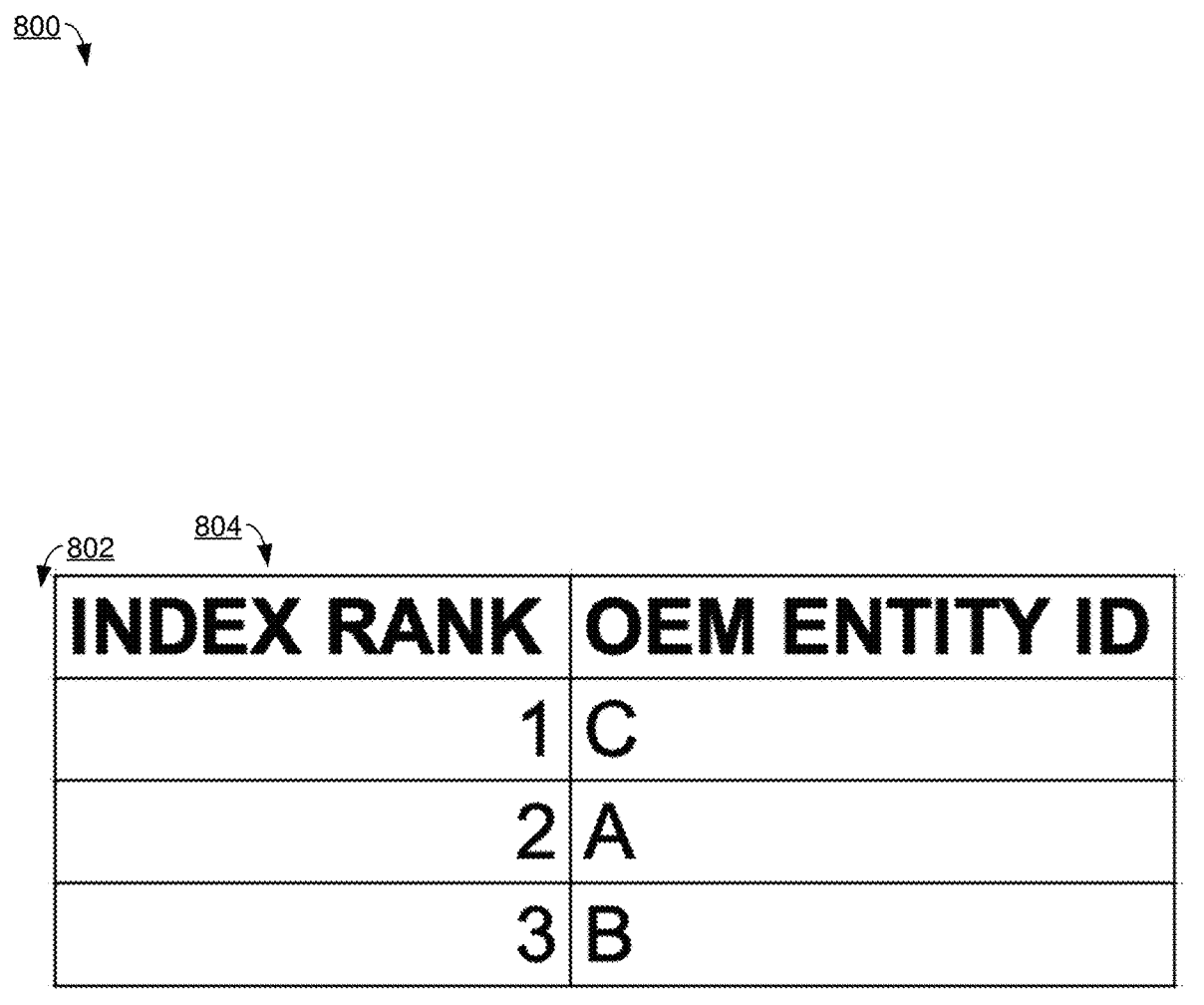

In the course of facilitating computer update performance assessment, system architecture 100 can use part(s) of performance data 300 of FIG. 3, performance data 400 of FIG. 4, feature configurations 500 of FIG. 5, feature data collection 600 of FIG. 6, perception report 700 of FIG. 7, performance ranking 800 of FIG. 8, and/or performance ranking 900 of FIG. 9.

In some examples, implementations of the present techniques can access existing information about user device performance data and configuration details. In some examples, implementations of the present techniques can fetch the data directly via channel interfaces.

Once the data is accessed, it can be cleaned up by removing dirty, duplicate, and or/stale data, aggregating and transforming the data, and converting the data into a known format.

Figure 2:
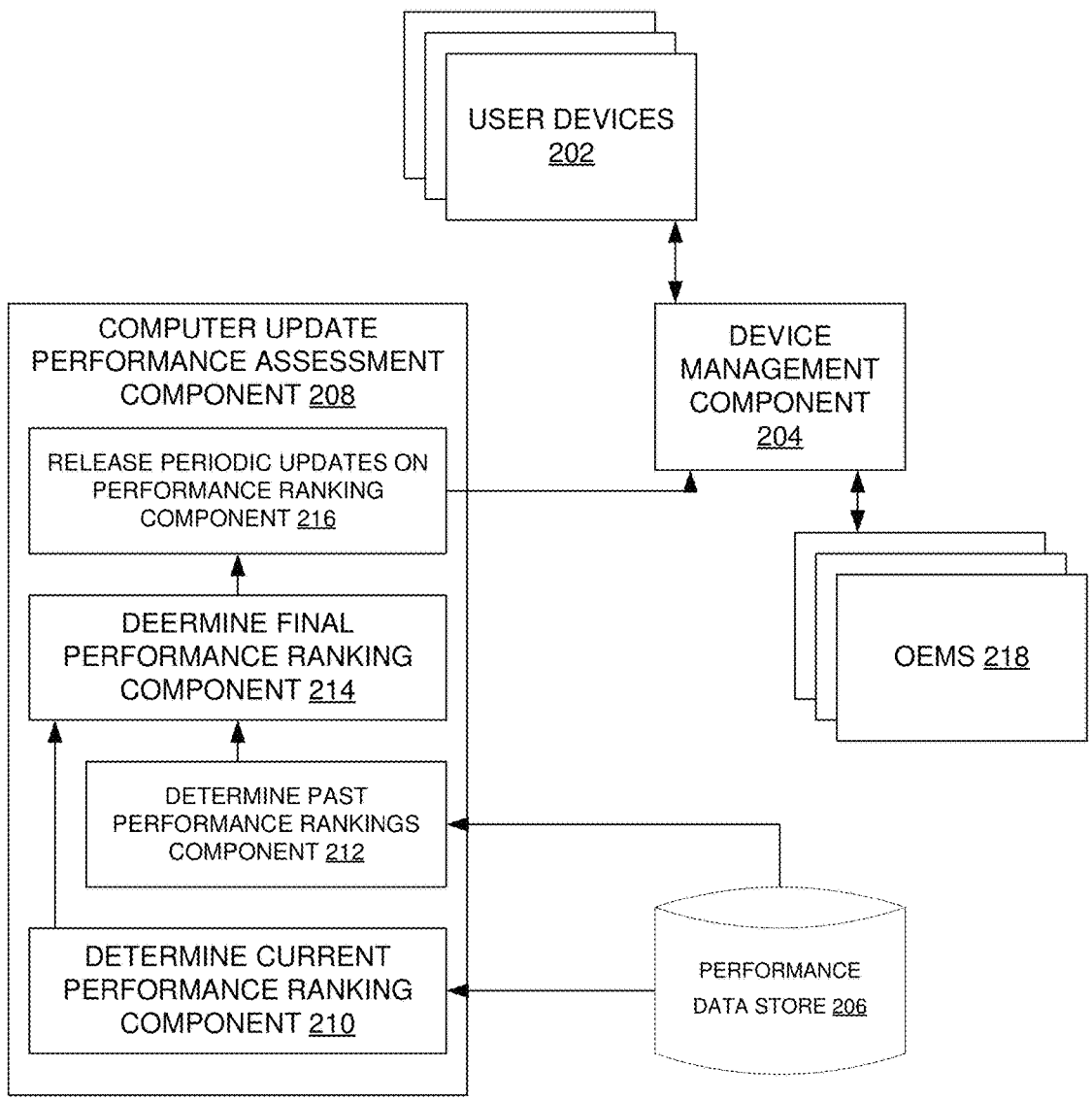
FIG. 2 illustrates another example system architecture that can facilitate computer update performance assessment, in accordance with an embodiment of this disclosure.

FIG. 2 illustrates another example system architecture 200 that can facilitate computer update performance assessment, in accordance with an embodiment of this disclosure. System architecture comprises user devices 202, device management component 204, performance data store 206, computer update performance assessment component 208, and OEMs 218. In turn, computer update performance assessment component 208 comprises determine current performance ranking component 210, determine past performance rankings component 212, determine final performance ranking component 214, and release periodic updates on performance ranking component 216.

In some examples, user devices 202 can be similar to user devices 102 of FIG. 1, device management component 204 can be similar to device management component 104, performance data store 206 can be similar to performance data store 106, and computer update performance assessment component 208 can be similar to computer update performance assessment component 108.

OEMs 218 can be devices of creators of updates that are published for user devices 202, can send information on new device updates and compatibility certifications to device management component 204, and can be implemented with part(s) of computing environment 1300 of FIG. 13. Device management component can receive this information and determine whether to instruct the user devices of user devices 202 to install the corresponding updates, and when.

Determine current performance ranking component 210 can determine a current performance ranking from information in performance data store 206, and this performance ranking can be similar to performance ranking 800 of FIG. 8. Similarly determine past performance rankings component 212 can determine performance rankings from previous points in time from information in performance data store 206, and these performance rankings can be similar to performance ranking 800 of FIG. 8.

Determine final performance ranking component 214 can use the rankings from both determine current performance ranking component 210 and determine past performance rankings component 212 to determine a final performance ranking, which can be similar to performance ranking 900 of FIG. 9.

Release periodic updates on performance ranking component 216 can periodically (e.g., once per day) release the final performance ranking from determine final performance ranking component 214 to device management component 204, which can use that information to determine whether (and when) to have user devices of user devices 202 install particular updates.

Example Transformations

FIG. 3 illustrates example performance data 300 that can facilitate computer update performance assessment, in accordance with an embodiment of this disclosure. Performance data comprises rows 302 and columns 304. Each row of rows 302 identifies information about a particular application that is installed on a user device, and each column of columns 304 identifies particular information about those applications. As depicted, there are three applications for which there is information—App A, App B, and App C. Then, there is information about those applications—their name, their publisher, their size, and their date of installation on the user device.

Performance data 300 can be used by computer update performance assessment component 108 of FIG. 1 to create a performance ranking, such as performance ranking 800 of FIG. 8.

FIG. 4 illustrates example performance data 400 that can facilitate computer update performance assessment, in accordance with an embodiment of this disclosure. Performance data comprises rows 402 and columns 404. Each row of rows 402 identifies information about a particular drive of a user device, and each column of columns 404 identifies particular information about those drives. As depicted, there are three drives for which there is information—C:, D:, and E:. Then, there is information about those drives—their name, a description of the drive, an indication of whether the drive is compressed, a type of file system used by the drive, a total size of the drive, and an amount of free space of the drive.

Performance data 400 can be used by computer update performance assessment component 108 of FIG. 1 to create a performance ranking, such as performance ranking 800 of FIG. 8.

FIG. 5 illustrates example feature configurations 500 that can facilitate computer update performance assessment, in accordance with an embodiment of this disclosure. Feature configurations comprises rows 502 and columns 504. Each row of rows 502 identifies information about a particular feature that will be analyzed from performance data, and each column of columns 504 identifies particular information about those features. As depicted, there are three features for which there is information—features with ID 1, ID 2, and ID 3. Then, there is information about those features—their ID, what the feature is, how a perception of the feature can be handled (e.g., can it be positive or negative, or can it be positive or no value), a threshold limit that defines what the perception is, and a weightage coefficient that indicates an importance of the feature in determining a performance ranking.

In some examples, a perception (e.g., positive or negative) can be used in place of a numerical value as a way to compare features across user devices that have different numerical threshold values. For example, one user device may have an acceptable temperature as long as it operates below 70 degrees Celsius, while another is considered to have an acceptable temperature as long as it operates below 90 degrees Celsius.

Feature configurations 500 can be used to extract features from performance data 300 of FIG. 3 and/or performance data 400 of FIG. 4 to produce feature data collection 600 of FIG. 6.

Collected data can comprise metrics that indicate customer device performance.

In some examples, using the collected data, a periodic (e.g., daily) perception report can be generated for each OEM. A perception of a feature can indicate whether the OEM device is positive or negative on that feature, such as with performance meets a threshold performance standard.

A perception or measurable performance metric can be determined as follows. Features that have a threshold defined can be positive or negative based on whether the threshold limit has been reached. Examples of these features can include error events, throttling count, and utilization. Where these features are within defined limits, they can be determined to be positive, and otherwise determined to be negative.

In some examples, features that do not have a defined threshold are either determined to be positive, or a determination is not made for them. These features can represent normal device activity, and can be taken into consideration to offset ranking non-active OEMs at an expense of active OEMs (e.g., a non-active OEM might have no negative features).

Using a periodic perception report, a periodic (e.g., daily) performance ranking can be determined. A periodic performance ranking can comprise a relative ranking of OEMs currently publishing updates.

FIG. 6 illustrates example feature data collection 600 that can facilitate computer update performance assessment, in accordance with an embodiment of this disclosure. Feature configurations comprises rows 602 and columns 604. Each row of rows 602 identifies information about a particular OEM, and each column of columns 604 identifies particular information about those OEMs. As depicted, there are four OEMs for which there is information—OEMs A, B, C, and D—and three features with which each OEM is analyzed— feature ID 1, ID2, and ID3.

Feature data collection 600 can be generated from performance data 300 of FIG. 3 and/or performance data 400 of FIG. 4.

FIG. 7 illustrates an example perception report 700 that can facilitate computer update performance assessment, in accordance with an embodiment of this disclosure. Perception report 700 comprises rows 702 and columns 704. Each row of rows 702 identifies information about a particular OEM, and each column of columns 704 identifies particular information about those OEMs. As depicted, there are four OEMs for which there is information—OEMs A, B, C, and D—and three features with which each OEM is analyzed— feature ID 1, ID2, and ID3. Relative to feature data collection 600, perception report 700 replaces the numerical value for a given OEM and feature with a perception value (e.g., positive or negative).

FIG. 8 illustrates an example performance ranking that can facilitate computer update performance assessment, in accordance with an embodiment of this disclosure. Performance ranking 800 comprises rows 802 and columns 804. Each row of rows 802 identifies a ranking (e.g., 1st or 2nd) and columns 804 identifies corresponding OEMs for those ranks (e.g., OEM C is ranked first). Rankings such as performance ranking 800 can be periodically determined, and then used to produce a final performance ranking, such as performance ranking 900 of FIG. 9.

FIG. 9 illustrates another example performance ranking 900 that can facilitate computer update performance assessment, in accordance with an embodiment of this disclosure. Performance ranking 900 comprises rows 902 and columns 904. Each row of rows 902 identifies a possible ranking order, and columns 904 identifies the specific ordering of OEMs in that rank, along with a final ranking score. The row with a highest final ranking score, can be determined to be the final performance ranking to be used.

A final performance ranking can be generated based on analyzing a current periodic performance ranking, as well as historical periodic performance rankings. In some examples, an optimal rank aggregation technique can be used to generate the final performance ranking. In some examples, the optimal rank aggregation technique can comprise an implementation of a Kemeny-Young technique.

In some examples, a Kemeny-Young technique can operate by creating a matrix that counts container pairwise feature perceptions. A positive perception can be construed as one vote, whereas a negative perception (or no perception) is not counted, and does not impact a final score. The possible ranking combinations can be analyzed, and a score can be determined for each ranking combination. A ranking that has a maximum score can be identified as a final ranking.

A final performance ranking can include a rank for OEMs that reflects their performance stability and quality of updates. A higher ranking for a OEM can correspond to a higher quality of update deliverables (e.g., software, components, firmware, device drivers, etc.) by that OEM.

A final performance ranking can be generated periodically (e.g., daily) and can be used by a user device management system to determine whether to publish a particular update to users.

In some examples, a Kemeny-Young technique can be implemented using a weighted graph based approach, which can be referred to as "integer programming formulation," and which can mitigate issues with computational complexity of some Kemeny-Young techniques when applied to large data sets.

Example Process Flows

FIG. 10 illustrates an example process flow 1000 that can facilitate computer update performance assessment, in accordance with an embodiment of this disclosure. In some examples, one or more embodiments of process flow 1000 can be implemented by distributed fault detection fog node 102*a* of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow process flow 1100 of FIG. 11 and/or process flow 1200 of FIG. 12.

Process flow 1000 begins with 1002, and moves to operation 1004. Operation 1004 depicts determining performance data for updates created by update creators that execute on devices during a time period, the performance data indicating performance of a group of metrics for a respective update of the updates. That is, updates from multiple OEMs that create updates can be live on user devices, and their performance can be measured according to multiple dimensions.

In some examples, a second update creator creates a second update of the updates and a third update of the updates, the second update differing from the third update. That is, the ranking can be performed at the OEM level rather than at the update level (one OEM can have multiple updates).

In some examples, a metric of the group of metrics has a binary value. That is, a perception value can be positive or negative, or in some examples, can be positive or no value.

In some examples, the binary value indicates a positive performance or a negative performance In some examples, the binary value indicates the positive performance where a performance according to the metric is above a threshold value.

In some examples, the binary value indicates a positive performance or depicts no indication of performance. In some examples, the binary value indicates the positive performance or depicts no indication of performance based on whether a threshold value is specified for the metric.

After operation 1004, process flow 1000 moves to operation 1006.

Operation 1006 depicts determining a first ranking of the update creators for the time period based on the performance data. That is, a daily ranking report can be generated for the OEMs (which can have published multiple updates and can be ranked on all the updates they have published).

After operation 1006, process flow 1000 moves to operation 1008.

Operation 1008 depicts determining a second ranking of the update creators based on applying a pairwise comparison count of respective rankings of update creators of the first ranking and rankings for time periods prior to the time period. That is, a current ranking report and historical ranking reports can be used to build a global quality index ranking, and this can be done using a Kemeny-Young approach.

After operation 1008, process flow 1000 moves to operation 1010.

Operation 1010 depicts determining whether to publish a first update from a first update creator of the update creators based on a position of the first update creator among the update creators in the second ranking. That is, it can be determined whether to publish a new update from a particular OEM based on where this OEM sits in the global ranking.

After operation 1010, process flow 1000 moves to 1012, where process flow 1000 ends.

FIG. 11 illustrates another example process flow 1100 that can facilitate computer update performance assessment, in accordance with an embodiment of this disclosure. In some examples, one or more embodiments of process flow 1100 can be implemented by distributed fault detection fog node 102*a* of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1000 of FIG. 10 and/or process flow 1200 of FIG. 12.

Process flow 1100 begins with 1102, and moves to operation 1104. Operation 1104 depicts determining performance data for updates created by update creators that execute on customer devices during a time period according to a group of metrics. In some examples, operation 1104 can be implemented in a similar manner as operation 1004 of FIG. 10.

After operation 1104, process flow 1100 moves to operation 1106.

Operation 1106 depicts determining a first ranking of the update creators for the time period based on the performance data. In some examples, operation 1106 can be implemented in a similar manner as operation 1006 of FIG. 10.

After operation 1106, process flow 1100 moves to operation 1108.

Operation 1108 depicts determining a second ranking of the update creators based on applying a pairwise comparison count of respective rankings of update creators of the first ranking and rankings for other time periods. In some examples, operation 1108 can be implemented in a similar manner as operation 1008 of FIG. 10.

In some examples, a length of the time period equals respective lengths of the other time periods. That is, in some examples, all time periods of the rankings are equally long (e.g., one day).

In some examples, applying of the pairwise comparison count comprises assigning score for respective possible orders of the second ranking, wherein the score indicates a number of pairwise comparison counts from the applying of the pairwise comparison count that corresponds to the respective possible orders. That is, a Kemeny-Young approach can be used.

After operation 1108, process flow 1100 moves to operation 1110.

Operation 1110 depicts determining whether to publish a first update from a first update creator of the update creators based on a ranking of the first update creator in the second ranking. In some examples, operation 1110 can be implemented in a similar manner as operation 1010 of FIG. 10.

In some examples, operation 1110 comprises periodically updating the second ranking to produce an updated second ranking, and determining whether to publish updates created subsequent to producing the updated second ranking based on the updated second ranking. That is, the rankings can be iteratively updated as new rankings are generated (e.g., once per day).

In some examples, a higher ranking in the second ranking relative to a lower ranking indicates that a corresponding update creator has consistently provided high quality updates as evaluated with respect to a criterion for consistent provision of at least a threshold quality for updates. That is, global quality rankings can reward consistent good performance Put another way, an OEM having good updates for a few days might not put that OEM at the top of the rankings; it can take time to rise to the top of the rankings.

In some examples, a lower ranking in the second ranking relative to a higher ranking indicates that a corresponding update creator has consistently provided low quality updates as evaluated with respect to a criterion for consistent provision of at most a threshold quality for updates. similarly with the higher rankings, the global quality rankings can penalize a lack of consistent good performance.

In some examples, the first update is omitted from being used to determine the first ranking or the second ranking. That is, an OEM's ranking can be used to evaluate whether to publish a brand new update—one that has not yet been deployed and evaluated to generate the rankings in the first place.

After operation 1110, process flow 1100 moves to 1112, where process flow 1100 ends.

FIG. 12 illustrates another example process flow 1200 that can facilitate computer update performance assessment, in accordance with an embodiment of this disclosure. In some examples, one or more embodiments of process flow 1200 can be implemented by distributed fault detection fog node 102a of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1000 of FIG. 10 and/or process flow 1100 of FIG. 11.

Process flow 1200 begins with 1202, and moves to operation 1204. Operation 1204 depicts determining performance metrics for respective first updates from update creators that execute via customer computers during a time period. In some examples, operation 1204 can be implemented in a similar manner as operation 1004 of FIG. 10.

In some examples, the performance metrics are determined by a customer computer management component that is external to the customer computers and that is configured to publish updates to the customer computers. That is, the data from user devices can be gathered by a device management component, such as device management component 104 of FIG. 1.

In some examples, a first update of the first updates comprises a software update, a firmware update, or a device driver update.

In some examples, the time period is one day or a multiple of one day.

After operation 1204, process flow 1200 moves to operation 1206.

Operation 1206 depicts determining a first ranking of the update creators for the time period based on the performance metrics. In some examples, operation 1206 can be implemented in a similar manner as operation 1006 of FIG. 10.

In some examples, the performance metrics are weighted. That is, features for an OEM can be weighted relative to each other.

After operation 1206, process flow 1200 moves to operation 1208.

Operation 1208 depicts determining a second ranking of the update creators based on applying a pairwise comparison of respective rankings of update creators in the first ranking and in other rankings for other time periods other than the time period. In some examples, operation 1208 can be implemented in a similar manner as operation 1008 of FIG. 10.

In some examples, the pairwise comparison comprises a Kemeny-Young approach.

After operation 1208, process flow 1200 moves to operation 1210.

Operation 1210 depicts determining whether to publish second updates from a first update creator of the update creators based on the second ranking. In some examples, operation 1210 can be implemented in a similar manner as operation 1010 of FIG. 10.

After operation 1210, process flow 1200 moves to 1212, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of device management component 104, performance data store 106, and/or computer update performance assessment component 108 of FIG. 1

In some examples, computing environment 1300 can implement one or more embodiments of the process flows of FIGS. 10-12 to facilitate computer update performance assessment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
      determining performance data for updates created by update creators that execute on devices during a time period, the performance data indicating performance of a group of metrics for a respective update of the updates;
      determining a first ranking of the update creators for the time period based on the performance data;
      determining a second ranking of the update creators based on applying a pairwise comparison count of respective rankings of update creators of the first ranking and rankings for time periods prior to the time period; and
      determining whether to publish a first update from a first update creator of the update creators based on a position of the first update creator among the update creators in the second ranking.

2. The system of claim 1, wherein a second update creator creates a second update of the updates and a third update of the updates, the second update differing from the third update.

3. The system of claim 1, wherein a metric of the group of metrics has a binary value.

4. The system of claim 3, wherein the binary value indicates a positive performance or a negative performance.

5. The system of claim 4, wherein the binary value indicates the positive performance where a performance according to the metric is above a threshold value.

6. The system of claim 3, wherein the binary value indicates a positive performance or comprises no indication of performance.

7. The system of claim 6, wherein the binary value indicates the positive performance or comprises no indication of performance based on whether a threshold value is specified for the metric.

8. A method, comprising:
   determining, by a system comprising at least one processor, performance data for updates created by update creators that execute on customer devices during a time period according to a group of metrics;
   determining, by the system, a first ranking of the update creators for the time period based on the performance data;
   determining, by the system, a second ranking of the update creators based on applying a pairwise comparison count of respective rankings of update creators of the first ranking and rankings for other time periods that are different from the time period; and determining, by the system, whether to publish a first update from a first update creator of the update creators based on a ranking of the first update creator in the second ranking.

9. The method of claim 8, wherein a length of the time period equals respective lengths of the other time periods.

10. The method of claim 8, further comprising:

periodically updating, by the system, the second ranking to produce an updated second ranking; and determining, by the system, whether to publish updates created subsequent to producing the updated second ranking based on the updated second ranking.

11. The method of claim 8, wherein the applying of the pairwise comparison count comprises:

assigning, by the system, a score for respective possible orders of the second ranking, wherein the score indicates a number of pairwise comparison counts from the applying of the pairwise comparison count that corresponds to the respective possible orders.

12. The method of claim 8, wherein a higher ranking in the second ranking relative to a lower ranking indicates that a corresponding update creator has consistently provided high quality updates as evaluated with respect to a criterion for consistent provision of at least a threshold quality for updates.

13. The method of claim 8, wherein a lower ranking in the second ranking relative to a higher ranking indicates that a corresponding update creator has consistently provided low quality updates as evaluated with respect to a criterion for consistent provision of at most a threshold quality for updates.

14. The method of claim 8, wherein the first update is omitted from being used to determine the first ranking or the second ranking.

15. A non-transitory computer-readable medium comprising instructions that, in response to execution, cause a system comprising at least one processor to perform operations, comprising:

determining performance metrics for respective first updates from update creators that execute via customer computers during a time period;

determining a first ranking of the update creators for the time period based on the performance metrics;

determining a second ranking of the update creators based on applying a pairwise comparison of respective rankings of update creators in the first ranking and in other rankings for time periods different from the time period; and determining whether to publish second updates from a first update creator of the update creators based on the second ranking.

16. The non-transitory computer-readable medium of claim 15, wherein the performance metrics are determined by a customer computer management component that is external to the customer computers and that is configured to publish updates to the customer computers.

17. The non-transitory computer-readable medium of claim 15, wherein the performance metrics are weighted.

18. The non-transitory computer-readable medium of claim 15, wherein a first update of the first updates comprises a software update, a firmware update, or a device driver update.

19. The non-transitory computer-readable medium of claim 15, wherein the pairwise comparison comprises a Kemeny-Young approach.

20. The non-transitory computer-readable medium of claim 15, wherein the time period is one day or a multiple of one day.

* * * * *